Figure 1:
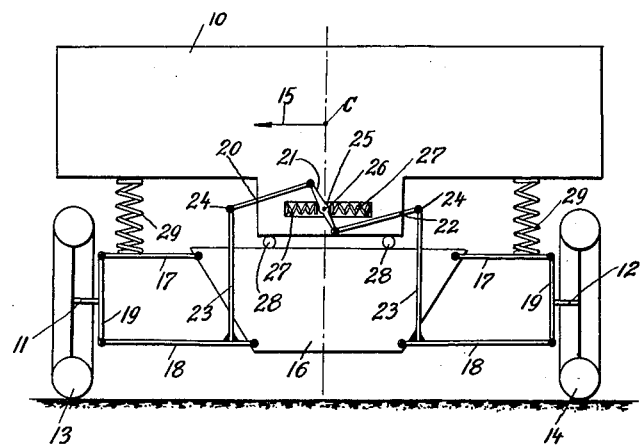

May 14, 1963  E. J. H. FIALA  3,089,710
MECHANISM FOR CONTROLLING OUTWARD INCLINATION
OF A VEHICLE BODY IN CURVES
Filed Feb. 17, 1959  3 Sheets-Sheet 1

Inventor
ERNST J. H. FIALA
BY Dicke, Craig & Freudenberg
ATTORNEYS

May 14, 1963  E. J. H. FIALA  3,089,710
MECHANISM FOR CONTROLLING OUTWARD INCLINATION
OF A VEHICLE BODY IN CURVES
Filed Feb. 17, 1959  3 Sheets-Sheet 2
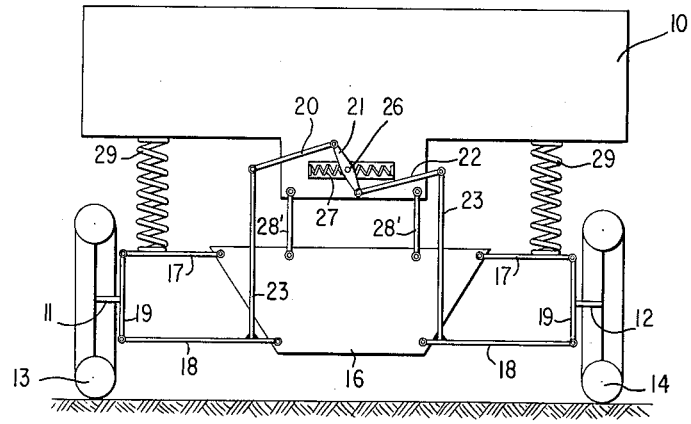
FIG. 1.A
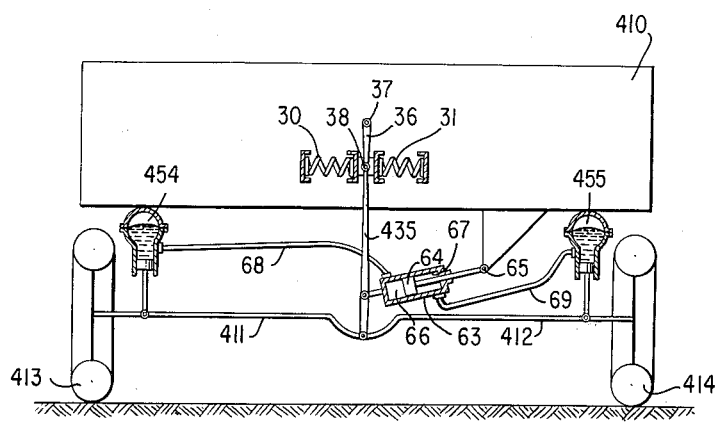
FIG. 4.A
INVENTOR.
ERNST J.H. FIALA
BY Dicke, Craig & Freudenberg
ATTORNEYS Inventor
ERNST J. H. FIALA
BY Dicke, Craig & Freudenberg
ATTORNEYS United States Patent Office 3,089,710
Patented May 14, 1963

3,089,710
MECHANISM FOR CONTROLLING OUTWARD INCLINATION OF A VEHICLE BODY IN CURVES
Ernst J. H. Fiala, Sindelfingen Kreis Boblingen, Germany, assignor to Daimler-Benz Aktiengesellschaft, Stuttgart-Unterturkheim, Germany
Filed Feb. 17, 1959, Ser. No. 793,757
Claims priority, application Germany Feb. 21, 1958
14 Claims. (Cl. 280—112)

My invention relates to a mechanism for controlling the tendency of the body of a vehicle, particularly a motor vehicle, to incline outwardly in curves under the effect of the centrifugal force. In vehicles having a body supported on the axles of the wheels for relative up and down springing movement, the vector of the centrifugal force effective in the center of gravity of the body, as a rule, is located above and spaced from the momentaneous center of the angular displacement of the body effected by the centrifugal force. Owing to the distance between this vector and this center a rolling couple is produced acting about an axis extending through said center fore-and-aft of the vehicle and this couple tends to incline the body of the vehicle outwardly in curves by an angle causing the springs of the vehicle to develop a counteracting couple of the same magnitude.

It is the object of my invention to provide a mechanism for controlling the tendency of the body to incline outwardly in curves to thereby reduce or eliminate or even over-compensate this inclination.

Further objects of my invention will appear from a detailed description of a number of embodiments thereof illustrated in the accompanying drawings. I wish it to be clearly understood, however, that my invention is in no way limited to the details of such embodiments but is capable of numerous modifications within the scope of the appended claims and that the terms and phrases used in such detailed description have been chosen for the purpose of explaining rather than that of restricting or limiting my invention.

Figure 2:
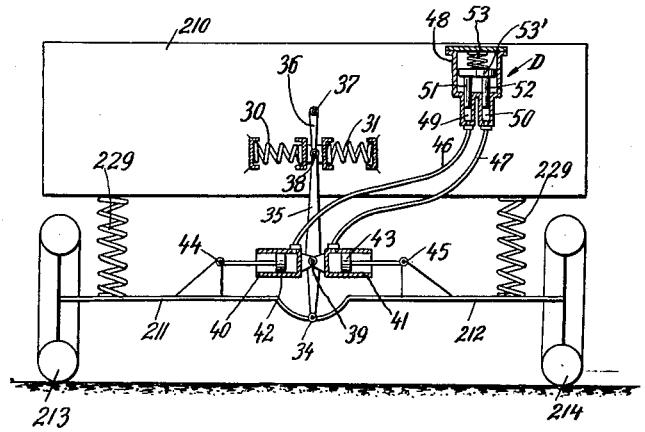
Figure 3:
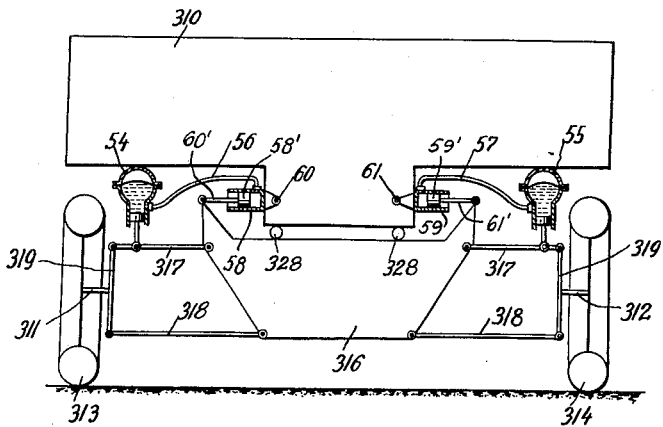
Figure 4:
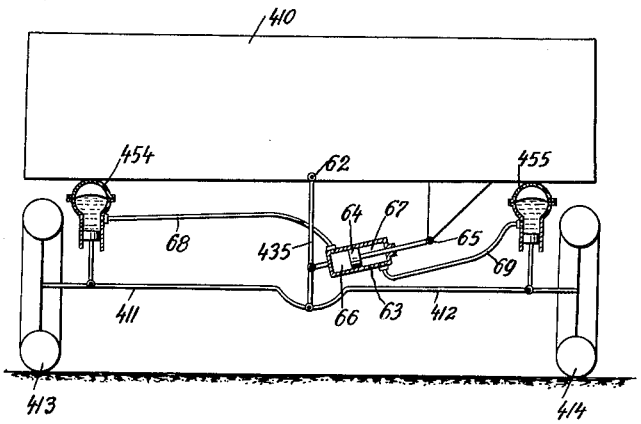

In the drawings representing front views of motor vehicles equipped with my novel mechanism:

FIG. 1 shows a vehicle in which the body thereof acts by mechanical means on pairs of links guiding the wheel axles for up and down springing motion, FIGURE 1A shows a modified form of the vehicle illustrated in FIGURE 1, FIG. 2 shows a vehicle in which a pair of oscillating half-axles is connected by cylinder-piston-units with an oscillating arm to which the axles are articulated for determining the relative angular disposition of the latter, FIG. 3 shows a vehicle in which transverse displacement of the body relative to a support causes hydro-pneumatic springs to be actuated by a fluid under pressure, and FIG. 4 represents a vehicle having a pair of half-axles and hydro-pneumatic springs actuated in response to a change of the angular position of an arm serving to suspend said axles, FIGURE 4A shows a modified form of the device illustrated in FIGURE 4.

The vehicle shown in FIG. 1 has a body 10 supported on the axles 11 and 12 of front wheels 13 and 14 for relative up and down springing movement. The vector 15 of the centrifugal force acts upon the body 10 at the center C of gravity in an outward direction with reference to a curve through which the vehicle is being driven. In the example illustrated in FIG. 1 it has been assumed that the curve is a left-hand curve, FIG. 1 being a front view of the vehicle. This force 15 has the tendency to incline the body outwardly. For the purpose of reducing or eliminating or even over-compensating this tendency, I have provided the mechanism described hereinafter.

This mechanism includes suitable guiding means connected to the body 10 and to the axles 11, 12 of the wheels 13 and 14 for guiding the body 10 relative to the axles 11 and 12 for up and down movement and for lateral displacement in the direction of the arrow 15 under the effect of the centrifugal force. For this purpose a support 16 is connected by two pairs of parallel links 17, 18 with an axle carrier 19 to which the axle 11, or 12 respectively, is secured. In this manner, each wheel 13, or 14 respectively, is guided for up and down movement relative to the support 16.

Moreover, suitable means are connected to the body 10 and to the support 16 for mounting the body 10 on the support 16 for lateral displacement in a direction parallel to the arrow 15. In FIG. 1 these means are diagrammatically indicated by a pair of rollers 28. It will be readily understood, however, that any other suitable guiding means may be used, for instance a pair of parallel links 28′ as illustrated in FIGURE 1A wherein each link has its upper end pivotally connected to the body 10 and its lower end pivotally connected to the support 16. Moreover, my novel mechanism includes actuating means which are cooperatively connected to the guiding means and to said body 10 and are responsive to the centrifugal displacement thereof for exerting a bracing force which produces a couple counteracting the couple produced by the centrifugal force 15. In the embodiment shown in FIG. 1 this actuating means is constituted by mechanical elements only, to wit by connecting means 20, 21 and 22 which connect the body 10 to the wheel-carrying elements 18 in the following manner. An arm 23 is rigidly connected to each link 18 near the inner end thereof, for instance by welding, so as to form a bell crank having an upright arm 23 extending to a pivot point 24 located at a higher level than the axles 11 and 12. The connecting means 20, 21 and 22 connect the wheel-carrying bell cranks 18, 23 to the body 10 for lateral displacement of the body in a substantially horizontal direction relative to the support 10. More particularly, the connecting means comprises a two-armed lever 21 fulcrumed to the body 10 and the pair of links 20 and 22, each link connecting one of the arms of lever 21 to one of the wheel-carrying bell cranks at the pivot point 24. Preferably, resilient means are provided for connecting the fulcrum of the two-armed lever 21 to the body 10. In the embodiment shown the body 10 of the vehicle is provided with a horizontal guiding slot 25 in which a block 26 is guided for horizontal displacement, and helical springs 27 are inserted between the end walls of the slot and the block 26. The two-armed lever 21 is fulcrumed on the block 25. Helical springs 29 are interposed between the body 10 and the wheel-guiding links 17.

The operation is as follows: Let it be assumed that the vehicle is driven through a curve setting up a centrifugal force 15 tending to displace the body 10 on the support 16 in the direction of the arrow 15. Under the pressure of the helical spring 27 the block 26 tends to participate in this displacement causing the linkage 20, 21, 22 to turn each of the bell cranks 18, 23 anticlockwise. Consequently, one pair of wheel-guiding links 17, 18 tends to lower the axle 11, while the other pair of links 17, 18 tends to lift the axle 12. Therefore, the pressure set up in the spring 27 by the horizontal displacement of the body 10 will produce a couple counteracting the tendency of the centrifugal force to incline the body.

When both wheels 13 and 14 perform a springing movement relative to the body 10 in the same sense, i.e. either upwardly or downwardly, the links 20 and 22 will rock the two-armed lever 21 about its fulcrum without displacing the block 26 in the slot 25. If one of the wheels 13, 14 only performs a springing movement, the consequent movements of its associated bell crank 18, 23 and the link 22, or 20 respectively, will displace the block 26. Owing to the provision of the springs 27 and the movability of the block 26 in the slot 25, no substantial lateral displacement of the body 10 will result since substantial lateral displacement of the body 10 will result since the force set up in one of the springs 27 acts over an extremely limited period of time in which even a powerful force will be unable to produce a substantial horizontal displacement of the body 10.

While the mechanism described hereinabove has been associated with the front wheels 13 and 14, a similar mechanism may be associated with the rear wheels of the vehicle, if desired.

In FIG. 2 I have illustrated an embodiment of my invention in which the mechanism for controlling the tendency of the body to incline outwardly in curves includes fluid-operable means.

In the embodiment of my invention illustrated in FIG. 2, the guiding means connected to the body 210 and to the axles of the wheels 213 and 214 for guiding the body relative to said axles for up and down movement and for lateral displacement in an outward direction under the effect of a centrifugal force in curves comprises a member, such as an upright arm 35, pivotally connected to the body 210 for oscillation in the direction of the lateral displacement of the body, and a pair of half axles 211 and 212 which carry the wheels 213 and 214 and are linked to the lower end of the arm 35. The means for pivotally connecting the member 35 to the body 210 may comprise an element movably mounted on the body 210, such as an arm 36 pivotally connected to the body for swinging movement about a pivot 37, and springs 30 and 31 which are coordinated to the element 36 and to the body 210 for restraining movement of the arm 36 in the direction of the displacement of the body 210 under the centrifugal force. As shown in FIG. 2, the springs 30 and 31 are helical springs braced against brackets fixed to the body 210 and acting on a block pivotally connected to the lower end of arm 36 and to the upper end of arm 35. The guiding means for guiding the body 210 relative to the wheels for up and down movement comprises a pair of half-axles 211 and 212 having their inner ends articulated to the lower end of the arm 35, each half axle being provided with an upwardly extending bracket. Helical springs 229 are interposed between the body 210 and the half-axles 211 and 212. In this embodiment the actuating means comprises a pair of cylinder-piston-units, each unit being connected to the member 35 and to one of the half-axles 211, or 212 respectively, for determining the angular disposition of the half-axle relative to the member 35. To this end, each of a pair of cylinders 40 and 41 is pivotally connected to the member 35 at the pivot point 39 and includes a movably guided piston 42, or 43, respectively, having a piston rod connected by a pivot pin 44, or 45 respectively, to a bracket fixed to the respective half-axle 211, or 212 respectively. A compensating device D communicates with the cylinders 40 and 41 for affording liberty to the half axles 211 and 212 of performing concomitant springing movements in the same sense while counteracting concomitant springing movements of the half-axles in opposite senses. In the embodiment shown, this compensating device D comprises a pair of cylinders 49, 50 integral with a housing 48 fixed to the body 210, the end of each of these cylinders being connected by a suitable duct, for instance a flexible pipe 46, or 47 respectively, with the inner end of the cylinder 40, or 41 respectively. A pair of plungers 51 and 52, which are rigidly connected to each other by a cross-head 53' extend into the cylinders 49 and 50 being slidably guided therein. A spring 53 is inserted between the cross-head 53' and the cover of the housing 48.

The operation is as follows: When the body 210 tends to be displaced to the left by a centrifugal force, the arm 35 tends to swing about the pivot point 34 in counter-clockwise direction. Owing to this tendency, a fluid under pressure, such as oil, filling the flexible ducts 46 and 47 and the pressure spaces of the cylinders 40, 41, 49 and 50 is displaced from the cylinder 40 and through the duct 46 into the cylinder 49 compelling the plungers 51 and 52 to rise contrary to the force of the spring 53. Because of the increase of the volume of the space 59 the fluid is sucked through the duct 47 causing the piston 43 to move to the left. Hence, pressure exerted upon the piston 42 tends to depress the half-axle 211 in the direction away from the body 210 while the atmospheric pressure acting on the piston 43 tends to lift the half-axle 212 in the direction towards the body 210. These tendencies counteract the couple produced by the centrifugal force tending to incline the body in outward direction with reference to the curve. A springing movement of both wheels 213 and 214 in the same sense is afforded by the provision of the spring 53 as such springing movement produces a displacement of the pistons 42 and 43 in opposite directions causing the plungers 51 and 52 to move upwardly or downwardly.

In the embodiment of my invention illustrated in FIG. 3 the mechanism for controlling the tendency of the body to incline outwardly in curves includes guiding means connected to the body 310 and to the axles 311 and 312 of the wheels 313 and 314 for guiding the body 310 relative to the axles for up and down movement and for lateral displacement in an outward direction under the effect of a centrifugal force in curves, such guiding means being similar to those illustrated in FIG. 1 comprising a support 316 and two pairs of links 317 and 318 which are pivotally connected to the carriers 319 of the axles 311 and 312. Suitable means diagrammatically indicated by the rollers 328 serve for mounting the body on the support 316 for lateral displacement in an outward direction under the effect of a centrifugal force in curves. The actuating means cooperatively connected to the wheel-guiding means and to the support 316 for exerting bracing forces upon the body comprise a pair of cylinder-piston-units, each unit being connected between the body 310 and the support 316 and hydro-pneumatic springs interposed between the body 310 and the links 317. Each unit includes a cylinder 58, or 59 respectively, having its inner end pivotally connected to the body 310 by a substantially horizontal pivot pin 60, or 61 respectively, and a piston 58', or 59' respectively, having the outer end of the piston rod 60', or 61' respectively, associated therewith pivotally connected to the support 316. Ducts formed by flexible pipes 56 and 57 extend between the cylinder-piston-units and the hydro-pneumatic springs 54 and 55, each duct establishing a communication between the pressure space in the respective cylinder 58, or 59 respectively, and the associated hydro-pneumatic spring 54, or 55 respectively. Each hydro-pneumatic spring comprises a cylinder secured to the body 310 by suitable means and a plunger in said cylinder pivotally connected to the link 317, the cylinder including a space subdivided by a diaphragm into an upper chamber and a lower chamber, the upper chamber being filled by a suitable gaseous medium and the lower chamber being filled by a liquid. The duct 56, or 57 respectively, communicates with the lower chamber.

The operation of this embodiment is as follows: When the centrifugal force tends to displace the body 310 to the left with reference to the support 316, liquid will be displaced from the cylinder 58 and will be pressed through the duct 56 into the hydro-pneumatic spring 54. At the same time liquid will be sucked into the cylinder 59 through the duct 57 from the hydro-pneumatic spring 55. As a result, the spring 54 has the tendency to extend, whereas the spring 55 has the tendency of contracting. In this manner, the two hydro-pneumatic springs are caused to produce a couple counteracting that produced by the centrifugal force upon the body 310.

Preferably, each of the ducts 56 or 57 has a restricted cross-section for throttling the flow therethrough to a degree which curtails the effect of short springing oscillations of the links 317 upon the passage of liquid through the ducts 56 and 57. This restriction of the cross-section of the ducts 56 and 57 may be effected by the insertion of throttling valves therein, if desired. As a result, short swinging oscillations of the wheels will not result in any substantial lateral displacement of the body 310 on the support 316 by fluctuations of liquid through the ducts 56 and 57.

In the embodiment illustrated in FIG. 4 the axle-guiding means are similar to those illustrated in FIG. 2, half-axles 411 and 412 being provided for supporting the wheels 413 and 414, such half axles having their inner ends articulated to the lower end of a member 435 the upper end of such member being pivotally connected to the body 410 by suitable means diagrammatically represented by a pivot pin 62. It is to be understood, however, that the elements 30, 31, 36, 37 and 38 of FIG. 2 may be substituted for the pin 62 as illustrated in FIGURE 4A. Hydro-pneumatic springs 454 and 455 similar to the springs 54 and 55 shown in FIG. 3 are interposed between the body 410 and the half-axles 411 and 412. The actuating means in this embodiment comprise a double-acting cylinder piston unit which is pivotally connected to the member 435 and includes a pair of cylinder chambers 66 and 67 provided in the cylinder 63 and separated by the piston 64, the piston rod being linked to a downwardly depending bracket fixed to the body 410 by a pivot pin 65. The chamber 66 communicates with the liquid-filled chamber of spring 454 by a duct 688 formed by a flexible pipe, whereas the chamber 67 communicates with the liquid-filled space of the spring 455 by a duct 69. If desired, each of these ducts may be provided with a restricted cross-section for throttling the flow therethrough to a degree curtailing the effect of springing oscillations of the half axles 411 and 412 upon the passage of liquid through the ducts.

The operation of this embodiment is as follows: When the body 410 tends to move to the left under the effect of a centrifugal force, the piston 64 likewise tends to move to the left within the cylinder 63. As a result, the liquid is fed through the duct 68 into the spring 454, thereby expanding the same, whereas liquid is sucked by the piston 64 through the duct 69 from the spring 455, thereby tending to contract same. Therefore, the springs will exert a couple upon the body 410 counteracting the tendency of the centrifugal force to incline the body.

If desired, the guiding means for guiding the body relative to the axles for up and down movement may be controlled by the actuating means through the intermediary of a servo-mechanism.

From the foregoing it will be seen that this invention is one well adapted to attain all of the ends and objects hereinabove set forth, together with other advantages which are obvious and which are inherent to the apparatus.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle having a body, a mechanism for controlling the tendency of said body to incline outwardly when said vehicle passes through a curve, comprising running gear means for supporting said body including at least one pair of oppositely disposed wheels and independent suspension means for each said wheel for controlling vertical movement thereof, means for permitting relative movement between said body and said running gear means including spring means for supporting said body on said running gear means, means interconnecting said body and said running gear means, said last-mentioned means being movable in response to said relative movement between said body and said running gear means, and further means responsive to said movement of said interconnecting means for exerting bracing forces upon said body and running gear means to counter the tendency of said body to incline outwardly when said vehicle passes through a curve.

2. A mechanism as defined in claim 1, wherein said spring means include hydro-pneumatic springs for supporting said body, and wherein said further means include fluid-pressure means responsive to said movement of said interconnecting means and means interconnecting said fluid-pressure means and said hydro-pneumatic springs, said bracing forces being exerted through said springs by a change of pressure therein effected by said fluid-pressure means through said interconnecting means.

3. A mechanism as defined in claim 1, wherein said running gear means includes a support, said independent wheel suspension means being secured to said support whereby said wheels are guided relative to said support and wherein said means for permitting relative lateral movement between said body and said running gear means includes guiding means connecting said body and said support.

4. A mechanism as defined in claim 3, wherein said spring means include a pair of hydro-pneumatic springs, and wherein said interconnecting means and said further means comprise a pair of cylinder-piston units, each said unit being pivotally connected to both said body and said support and including a pressure space, and duct means connecting each said pressure space with a respective one of said pneumatic springs.

5. A mechanism as defined in claim 4, wherein each of said ducts has a restricted cross-section for throttling the flow therethrough to a degree curtailing the effect of springing oscillations of said guiding means upon the passage of fluid through said ducts.

6. In a vehicle having a body, a mechanism for controlling the tendency of said body to incline outwardly when said vehicle passes through a curve, comprising running gear means for supporting said body including at least one pair of oppositely disposed wheels, a support, and independent suspension means for each said wheel for controlling vertical movement thereof including wheel-carrying elements for each wheel pivotally connected to said support and axle means pivotally connected to said elements, at least one of said elements for each wheel including means providing a pivot point located at a level higher than said axle means, means for permitting relative lateral movement between said body and said running gear means including spring means for supporting said body on said running gear means, means interconnecting said body and said running gear means comprising means connecting said body to each of said one elements at the said pivot point thereof, said last-mentioned means being movable in response to said relative movement between said body and said running gear means, and further means responsive to said movement of said last-mentioned means for exerting bracing forces upon said body and running gear means to counter the tendency of said body to incline outwardly when said vehicle passes through a curve.

7. A mechanism as defined in claim 6, wherein said connecting means comprises a two-armed lever fulcrumed to said body and a pair of link means, each link means connecting one of the arms of said lever to one of said one of said wheel-carrying elements at the said pivot point thereof.

8. A mechanism as defined in claim 7, wherein said further means includes resilient means for connecting the fulcrum of said two-armed lever to said body.

9. In a vehicle having a body, a mechanism for controlling the tendency of said body to incline outwardly when said vehicle passes through a curve, comprising running gear means for supporting said body including at least one pair of oppositely disposed wheels and independent suspension means for each said wheel for controlling vertical movement thereof including half-axle means for each said wheel, means for permitting relative lateral movement between said body and said running gear means including spring means for supporting said body on said running gear means, means interconnecting said body and said running gear means comprising a member linked to each said half-axle means and pivotally connected to said body for movement in response to said relative movement between said body and said running gear means, and further means responsive to said movement of said member for exerting bracing forces upon said body and running gear means to counter the tendency of said body to incline outwardly when said vehicle passes through a curve.

10. A mechanism as defined in claim 9, wherein the means for pivotally connecting said member to said body comprises an element movably mounted on said body for movement in the direction of said displacement and springs coordinated to said element and to said body for restraining said movement, said member being fulcrumed to said element.

11. A mechanism as defined in claim 9, wherein said spring means include a pair of hydro-pneumatic springs, each spring being connected to said body and to a respective one of said half-axle means and wherein said further means comprises a double-acting cylinder-piston unit pivotally connected to both said member and said body and including a pair of pressure chambers, and duct means establishing communication between each of said chambers and a respective one of said hydro-pneumatic springs.

12. A mechanism as defined in claim 9, wherein said further means comprises a pair of cylinder-piston units, each unit being connected to said member and a respective one of said half-axle means for determining the angular disposition of said axle means relative to said member, and a compensating device communicating with the cylinders of said units for affording the liberty to said half-axles of performing concomitant springing movement in the same sense while counteracting concomitant springing movement of said half-axles in opposite senses.

13. A mechanism as defined in claim 12, wherein said compensating device comprises a pair of compensating cylinders and a pair of rigidly connected plungers, each plunger being slidable in one of said compensating cylinders, and ducts, each duct establishing a communication of one of said compensating cylinders with a cylinder of one of said units.

14. A mechanism as defined in claim 11, wherein each of said ducts has a restricted cross-section for throttling the flow therethrough to a degree curtailing the effect of springing oscillations of said guiding means upon the passage of fluid through said ducts.

References Cited in the file of this patent
UNITED STATES PATENTS

| | | |
|---|---|---|
| 1,423,002 | Mercier | July 18, 1922 |
| 2,106,291 | Allison | Jan. 25, 1938 |
| 2,121,720 | Wedelstaedt | June 21, 1938 |
| 2,152,938 | Welch | Apr. 4, 1939 |
| 2,279,120 | Hurley | Apr. 7, 1942 |
| 2,657,067 | Kolbe | Oct. 27, 1953 |
| 2,703,718 | Hutchinson | Mar. 8, 1955 |
| 2,720,403 | Martin | Oct. 11, 1955 |
| 2,787,474 | Brueder | Apr. 2, 1957 |